United States Patent Office 3,156,668
Patented Nov. 10, 1964

3,156,668
PROCESS FOR THE CONDENSATION OF HYDROXYL - CONTAINING ORGANOSILICON COMPOUNDS USING LITHIUM HYDROXIDE OR LITHIUM DIORGANOSILANOLATE
Ronald M. Pike, Chelmsford, Mass., assignor to Union Carbide Corporation, a corporation of New York
No Drawing. Filed Dec. 8, 1959, Ser. No. 858,029
10 Claims. (Cl. 260—46.5)

This invention relates to a process for producing organosilicon compounds.

It is known that hydroxyl-containing organosilicon compounds represented by the formula:

(1)

wherein R is a substituted or unsubstituted monovalent hydrocarbon group, R' is an alkyl group or a hydrogen atom and $n$ has a value of at least one can be condensed in the presence of a catalyst (e.g. sulfuric acid or potassium silanolate) to produce a variety of useful diorganosiloxane products.

By way of illustration, it is known that those hydroxyl-containing organosilicon compounds represented by Formula 1 wherein R and R' have the above-defined meanings and $n$ has a value from 1 to 7 can be condensed to form cyclic diorgano-siloxanes (i.e. diorganosiloxane cyclic trimers to heptamers) which can be separated from the reaction mixture free of most of the monofunctional and trifunctional impurities that often contaminate the hydroxyl-containing organosilicon compounds. These pure cyclic diorganosiloxanes can then be used in conventional applications wherein monofunctional and trifunctional impurities produce deleterious effects (e.g. in the production of gums for use in producing silicone elastomers). However, the catalysts currently employed in effecting the condensation of these hydroxyl-containing organosilicon compounds also catalyze the equilibration of diorganosiloxanes. When equilibrium is reached in such equilibration reactions, the reaction mixture contains 6–18% by weight of the desired low molecular weight cyclic diorganosiloxanes and 82–94% by weight of higher molecular weight linear diorganopolysiloxanes (oils or gums). The equilibrium concentration of such low molecular weight cyclic diorganosiloxanes is conventionally increased above 18% by conducting the condensation in a solvent but, upon removal of the solvent from such reaction mixtures, the equilibrium concentration of these cyclic diorganosiloxanes reverts to 6–18% by weight unless the catalyst is also removed. Alternately, yields of the desired cyclic diorganosiloxanes higher than about 18% are conventionally obtained by continuously removing these cyclic diorganosiloxanes from the reaction mixture by distillation operations. The higher molecular weight diorganopolysiloxanes are thereby caused to depolymerize continuously to maintain the equilibrium concentration of the desired cyclic diorganosiloxanes in the reaction mixture. The necessity for such distillation operations increases process costs and so constitutes an undesirable feature of such processes.

As a further illustration, it is known that those hydroxyl-containing organosilicon compounds represented by Formula 1 wherein R and R' have the above-defined meanings and $n$ has a value of at least 8 can be condensed to form diorganopolysiloxane oils and gums that can be employed, for example, in producing silicone elastomers. However, as pointed out above, the catalysts currently employed in effecting the condensation of these hydroxyl-containing organosilicon compounds also catalyze equilibration reactions and so 6–18% by weight of the desired diorganopolysiloxane oils and gums are converted to lower molecular weight cyclic diorganosiloxanes (i.e. mostly diorganosiloxane cyclic trimers and tetramers). Consequently, the yield of the desired diorganopolysiloxane oils and gums are diminished and the oils and gums contain 6–18% by weight of the low molecular weight cyclic diorganosiloxanes.

This invention is based on the discovery that lithium hydroxide and lithium diorganosilanolates catalyze the condensation of hydroxyl-containing organosilicon compounds represented by Formula 1 but do not catalyze the equilibration of diorganosiloxanes to a significant extent. This invention provides a process which involves condensing hydroxyl-containing organosilicon compounds represented by Formula 1 in the presence of a catalytic amount of lithium hydroxide or a lithium diorganosilanolate.

The catalysts employed in this invention are lithium hydroxide and lithium diorganosilanolates which can be represented by the formula:

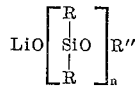

wherein R and $n$ have the meanings defined for Formula 1 and R'' is lithium or hydrogen. Illustrative of these silanolates are: $LiO[Me_2SiO]_nLi$, $LiO[Me_2SiO]_nOH$,

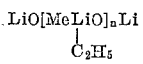

$Li[(C_6H_5)_2SiO]_nH$ and the like. These silanolates can be produced by known methods (e.g. by mixing two moles of lithium hydroxide and one mole of $HO(Me_2SiO)_{20}H$ and heating the mixture at 50° C. for one hour to produce $LiO(Me_2SiO)_{20}Li$.

The hydroxyl-containing organosilicon compounds employed in this invention are represented by Formula 1. Illustrative of the unsubstituted monovalent hydrocarbon groups represented by R in Formula 1 are the alkyl groups (e.g. the methyl, ethyl and octadecyl groups), the cycloalkyl groups (e.g. the cyclohexyl and the cyclopentyl groups), the aryl groups (e.g. the phenyl, tolyl, xylyl and naphthyl groups), the aralkyl groups (e.g. the benzyl and beta-phenylethyl groups), the alkenyl groups (e.g. the vinyl, allyl and hexenyl groups) and the cycloalkenyl groups (e.g. the cyclohexenyl groups). Illustrative of the substituted monovalent hydrocarbon groups represented by R in Formula 1 are the alkyl, cycloalkyl, aryl, aralkyl, alkenyl and cycloalkenyl groups containing as substituents one or more halogen atoms or amino, cyano, carbalkoxy, aminoalkylamino, hydroxyl or hydrocarbonoxy (e.g. alkoxy or aryloxy) groups. These substituents do not react to any significant extent during the condensation reaction. The groups represented by R in Formula 1 preferably contain from 1 to 10 carbon atoms. Illustrative of the alkyl groups represented by R' in Formula 1 are the methyl, ethyl and propyl groups. In Formula 1 $n$ can represent an average value in those cases where mixtures of hydroxyl-containing organosilicon compounds are employed.

Typical of the hydroxyl-containing organosilicon compounds represented by Formula 1 are those that are more specifically represented by the formulae.

(3)

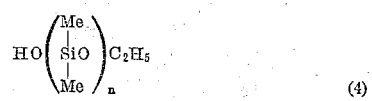

(4)

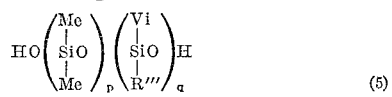

$$HO\left(\begin{array}{c}Me\\|\\SiO\\|\\Me\end{array}\right)_p \left(\begin{array}{c}Vi\\|\\SiO\\|\\R'''\end{array}\right)_q H \quad (5)$$

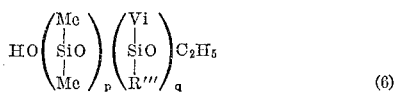

$$HO\left(\begin{array}{c}Me\\|\\SiO\\|\\Me\end{array}\right)_p \left(\begin{array}{c}Vi\\|\\SiO\\|\\R'''\end{array}\right)_q C_2H_5 \quad (6)$$

wherein $n$, $p$ and $q$ each have a value of at least one, and R''' is a methyl or an ethyl group. As used herein "Me" denotes the methyl group and "Vi" denotes the vinyl group.

The hydroxyl-containing organosilicon compounds employed in this invention can be produced by known processes. By one such known process, a diorganodialkoxysilane is hydrolyzed and partially condensed in a mixture of a water and a solvent (e.g. ether). By another such known process, a cyclic diorganosiloxane is reacted with steam at an elevated temperature and pressure.

In general amounts of catalyst that provide from 0.001 part to 10 parts by weight of lithium per 100 parts by weight of the starting hydroxyl-containing organosilicon compounds are useful in the process of this invention. Amounts of catalyst that provide 1 part to 2 parts of lithium per 100 parts by weight of the starting organosilicon compound are preferred. Although other than the indicated amounts of catalyst can be used, no commensurate advantage is gained thereby.

The process of this invention is advantageously conducted at a temperature from 25° C. to 175° C. However, the process is preferably conducted at a temperature from 90° C. to 150° C. Adherence to the indicated temperature ranges is generally desirable but not critical.

The process of this invention involves a condensation reaction that produces water as a byproduct and that can be represented by the skeletal equation:

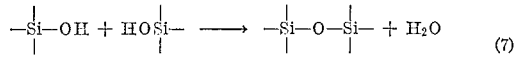

$$-\overset{|}{\underset{|}{Si}}-OH + HO\overset{|}{\underset{|}{Si}}- \longrightarrow -\overset{|}{\underset{|}{Si}}-O-\overset{|}{\underset{|}{Si}}- + H_2O \quad (7)$$

When hydroxyl-containing organosilicon compounds represented by Formula 1 wherein R' is an alkyl group are employed condensation reaction represented by the following skeletal equation can also occur to produce an alcohol as a byproduct:

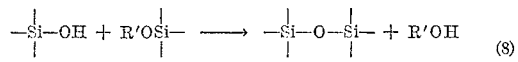

$$-\overset{|}{\underset{|}{Si}}-OH + R'O\overset{|}{\underset{|}{Si}}- \longrightarrow -\overset{|}{\underset{|}{Si}}-O-\overset{|}{\underset{|}{Si}}- + R'OH \quad (8)$$

However in the latter case, the reaction represented by Equation 7 occurs concurrently and at a faster rate. The water or the water and alcohol produced as a byproduct is preferably continuously removed from the reaction mixture during the reaction by suitable means, e.g. by heating the reaction mixture at reduced pressure (preferably from 1 to 10 mm. of Hg) at the above-mentioned preferred temperatures to volatilize the water or water and alcohol.

The hydroxyl containing organosilicon compounds and the catalyst can, if desired, be dissolved in an inert liquid organic compound in which they are mutually soluble and the process of this invention can be conducted therein. Suitable liquid organic compounds are ethers (e.g. diethyl ether and n-butyl ether), aromatic hydrocarbons (e.g. xylene and toluene) and aliphatic hydrocarbons (e.g. n-decane). Amounts of these liquid organic compounds from 10 parts to 1000 parts by weight per 100 parts by weight of the starting hydroxyl-containing organosilicon compounds are useful but amounts of the liquid organic compounds from 50 parts to 200 parts by weight of the starting hydroxyl-containing organosilicon compounds are preferred. At the completion of the process, the liquid organic compound can be removed from the desired diorganosiloxane by any suitable means, e.g. by heating the reaction mixture to a temperature sufficiently elevated to volatilize the liquid organic compound.

At the completion of the process of this invention the catalyst can be removed from the diorganosiloxane by any suitable means e.g. by washing the diorganopolysiloxane with acidified water.

Those hydroxyl-containing organosilicon compounds that are represented by Formula 1 wherein R and R' have the above-defined meanings and $n$ has a value from 1 to 7 are condensed according to the process of this invention to produce mixtures containing cyclic diorganosiloxanes having the formula:

$$(R_2SiO)_p \quad (9)$$

wherein R has the above-defined meaning and $p$ has a value from 3 to 7 and higher molecular weight linear diorganopolysiloxanes. When the condensation of the latter-mentioned hydroxyl-containing organosilicon compounds is conducted in the above-mentioned solvents, yields of cyclic diorganosiloxanes represented by Formula 9 as high as 40% are obtained. Owing to the fact that the catalysts employed in this invention do not catalyze the equilibration of cyclic diorganosiloxanes represented by Formula 9 to form higher molecular weight diorganopolysiloxanes, the yield to these cyclic diorganosiloxanes is not reduced by such reactions when the solvent is removed. Continuous distillation of such cyclic diorganosiloxanes from the reaction mixture is not necessary to obtain yields as high as 40%.

Those hydroxyl-containing organosilicon compounds that are represented by Formula 1 wherein R and R' have the above-defined meanings and $n$ has a value of at least eight are condensed according to the process of this invention to produce linear diorganosiloxanes having the formula:

$$R'O\left[\begin{array}{c}R\\|\\SiO\\|\\R\end{array}\right]_q R' \quad (10)$$

wherein R and R' have the above-defined meaning and $q$ has a value of at least sixteen. Owing to the fact that the catalysts employed in this invention do not catalyze the equilibration of such dimethylpolysiloxanes, these dimethylpolysiloxanes are produced essentially free of low molecular weight cyclic siloxanes (i.e. they contain from 0% to 3% by weight of such cyclic siloxanes).

In the production of linear diorganopolysiloxanes represented by Formula 10 according to the process of this invention, the initial product is an oil. As the process is continued the viscosity of the oil increases till, in the case of alkoxy-containing hydroxyl-containing organosilicon compounds, a stable alkoxy end-blocked diorganopolysiloxane oil is produced. In the latter case, the process can be stopped at an intermediate point (e.g. by removing the catalyst) to obtain a diorganopolysiloxane oil containing both hydroxyl and alkoxy end-blocking groups. In the case of hydroxyl-containing organosilicon compounds free of alkoxy groups, the final product is a gum but the process can be stopped at an intermediate point to produce a hydroxyl end-blocked diorganopolysiloxane oil.

The diorganopolysiloxane oils produced in accordance with the process of this invention are preferably those represented by Formula 10 wherein R and R' have the above-defined meanings and $q$ has a value from 200 to 4000. These oils can be produced by conducting the process until the viscosity or any other conveniently measured property of the oil indicates that the desired molecular weight has been obtained and then removing the catalyst by any suitable means (e.g. by washing the oil with water to dissolve the catalyst).

The diorganopolysiloxane gums produced in accordance with the process of this invention are preferably those represented by Formula 10 wherein R and R' have the above-defined meanings and $q$ has a value from 6000 to 15,000. These gums can be produced by conducting the process until the hardness (as measured, for example, by a Miniature Penetrometer) or any other conveniently measured property indicates that the desired molecular weight has been obtained and then removing the catalyst by any suitable means (e.g. by washing the gum with water to dissolve the catalyst).

Those diorganopolysiloxane oils produced in accordance with the process of this invention that contain hydroxyl end-blocking groups undergo a gradual increase in viscosity owing to the condensation of these hydroxyl groups, especially if the oils are exposed to elevated temperatures. These oils can be stabilized against such increases in viscosity by reacting the oils with trihydrocarbonhalosilanes (e.g. trimethylchlorosilane) in order to convert the hydroxyl groups to stable trihydrocarbonsiloxy groups as illustrated by the equation:

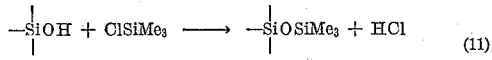
(11)

On the other hand, it is often desirable to leave these hydroxyl groups intact, e.g. when it is desired to react the oil with an alkyd resin in order to modify the properties of the resin.

Alkoxysilanes can be condensed along with the hydroxyl-containing organosilicon compounds represented by Formula 1 wherein $n$ has a value of at least eight according to the process of this invention. Suitable alkoxysilanes are those represented by the formula:

$$R_rSi(OR')_{4-r} \quad (12)$$

wherein R and R' have the above-defined meanings and $r$ has a value from 1 to 3. Such cocondensations involve reactions that can be represented by Equation 8. These cocondensations are useful in producing diorganosiloxanes containing functional groups uniformly spaced throughout the siloxane chain or at the end of the siloxane chain. By way of illustration, a hydroxy-containing dimethylpolysiloxane can be cocondensed with methylvinyldiethoxysilane to produce a siloxane containing uniformly spaced vinyl groups according to the equation:

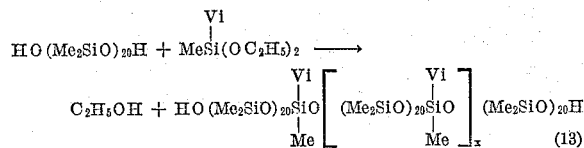
(13)

wherein $x$ is an integer. The siloxane so produced can be cured through the vinyl groups to produce a silicone gum. As a further illustration, hydroxy-containing dimethylpolysiloxanes [e.g. $HO(Me_2SiO)_{20}H$] can be cocondensed with methyltriethoxysilane to produce a siloxane containing uniformly spaced ethoxy groups which can be hydrolyzed and condensed to convert the siloxane to a silicone resin. As another illustration, a hydroxyl-containing dimethylpolysiloxane [e.g. $HO(Me_2SiO)_{20}H$] can be cocondensed with gamma-hydroxypropyldimethylethoxysilane to produce a siloxane containing gamma-hydroxypropyl chain terminating groups.

Illustrative of the alkoxysilanes represented by Formula 12 are: methyltriethoxysilane, methylvinyldiethoxysilane, gamma-aminopropylmethyldiethoxysilane, beta-carbethoxyethylmethyldiethoxysilane, gamma - cyanopropylmethyldiethoxysilane, N-(beta-amino-ethyl)-gamma-aminoisobutylmethyldiethoxysilane, methyltriethoxysilane, trimethylethoxysilane and gamma-hydroxypropyldimethylethoxysilane.

The diorganosiloxanes that are produced in accordance with the process of this invention are known compounds that are useful in a variety of applications. Thus the cyclic diorganosiloxanes can be converted to gums which can be used in producing silicone elastomers, the diorganopolysiloxane oils can be used as hydraulic fluids and the diorganopolysiloxane gums can be used in producing silicone elastomers.

The following examples illustrate the present invention:

*Example I*

A mixture was formed containing 10 grams of $HO(Me_2SiO)_{20}H$ and 0.2 gram of lithium hydroxide. The mixture was heated for 40 hours at 150° C. to produce a dimethylpolysiloxane gum free of low molecular weight cyclic dimethylsiloxanes.

*Example II*

A mixture was formed containing 3.5 grams of lithium hydroxide and 175 grams of a silicone oil represented by the average formula:

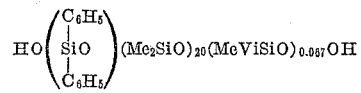

The mixture was heated for four days at 85° C. to produce a gum. The gum so produced (100 parts by weight) was mixed with 35 parts by weight of finely divided silica, 12 parts by weight of an ethoxy end-blocked dimethylpolysiloxane, 0.2 part by weight of iron oxide and 2.5 parts by weight of a solution of a peroxide curing agent. The lithium hydroxide had not been removed from the gum. The mixture was bin aged for four weeks, remilled, mold cured at 220° F. for 30 minutes and postcured at 350° F. for four hours to produce an elastomer. The linear shrinkage during the postcure was 3.0% due to curing and thermal contraction of the elastomer.

For comparison purposes, a catalyst-free dimethylpolysiloxane gum containing 12 wt.-percent of octamethylcyclotetrasiloxane was converted to an elastomer by a process essentially the same as that described above. This elastomer underwent a 7% linear shrinkage during postcure due to curing and thermal contraction of the elastomer and volatilization of low molecular weight cyclic diorganosiloxanes. The lower linear shrinkage of the former elastomer is due to the absence of low molecular weight cyclic diorganosiloxanes in the starting gum.

What is claimed is:

1. A process for condensing organosilicon compounds represented by the formula:

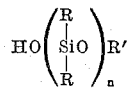

wherein R is a member selected from the group consisting of the unsubstituted monovalent hydrocarbon groups and the substituted monovalent hydrocarbon groups wherein each substituent is a member selected from the group of the halogen atom, and the amino, hydroxyl, cyano, carbalkoxy, aminoalkylamino, alkoxy and aryloxy groups, R' is a member selected from the group consisting of the alkyl groups and the hydrogen atom and $n$ has a value of at least one, which process comprises condensing an organosilicon compound represented by said formula in the presence of a catalytic amount of a compound selected from the group consisting of lithium hydroxide and the lithium diorganosilanolates.

2. A process for condensing organosilicon compounds represented by the formula:

(1)

wherein R is an alkyl group and $n$ has a value from 1 to 7 and R' is a member selected from the group consisting of the alkyl groups and the hydrogen atom to produce cyclic diorganosiloxanes represented by the formula:

$$(R_2SiO)_p \quad (2)$$

wherein R has the above-defined meaning and $p$ has a value from 3 to 7, which process comprises condensing an organosilicon compound represented by Formula 1 in the presence of a catalytic amount of a lithium diorganosilanolate represented by the formula:

$$\text{LiO}\left(\begin{array}{c}\text{R}\\|\\\text{SiO}\\|\\\text{R}\end{array}\right)_n\text{Li}$$

wherein R and $n$ have the above-defined meanings to produce a cyclic diorganosiloxane represented by Formula 2.

3. A process for condensing organosilicon compounds represented by the formula:

$$\text{HO}\left(\begin{array}{c}\text{R}\\|\\\text{SiO}\\|\\\text{R}\end{array}\right)_n\text{R}' \qquad (1)$$

wherein R is an alkyl group, $n$ has a value of at least eight and R' is a member selected from the group consisting of the alkyl group and the hydrogen atom to produce linear diorganopolysiloxanes represented by formula:

$$\text{R}'\text{O}[-\underset{|}{\overset{|}{\text{Si}}}\text{O}-]_q\text{R}' \qquad (2)$$
$$\phantom{R'O[-}\text{R}$$

wherein R and R' have the above-defined meanings, and $q$ has an average value of at least sixteen which process comprises condensing an organosilicon compound represented by Formula 1 in the presence of a catalytic amount of lithium hydroxide to produce a diorganopolysiloxane gum compound of groups represented by Formula 1.

4. A process for condensing organosilicon compounds represented by the formula:

$$\text{HO}\left(\begin{array}{c}\text{Me}\\|\\\text{SiO}\\|\\\text{Me}\end{array}\right)_n\text{H}$$

wherein $n$ has a value of at least eight to produce a dimethylpolysiloxane gum, which process comprises heating an organosilicon compound represented by said formula to a temperature from 25° C. to 175° C. in the presence of lithium hydroxide in an amount that provides from 0.001 part to 10 parts of lithium per 100 parts of the organosilicon compound to produce the gum.

5. A process for condensing organosilicon compounds represented by the formula:

$$\text{HO}\left(\begin{array}{c}\text{CH}_3\\|\\\text{SiO}\\|\\\text{CH}_3\end{array}\right)_p\left(\begin{array}{c}\text{CH}=\text{CH}_2\\|\\\text{SiO}\\|\\\text{R}''\end{array}\right)_q\text{H}$$

wherein R'' is a methyl group, $p$ and $q$ each have a value of at least one and the sum of $p$ and $q$ has a value of at least eight to produce a gum, which process comprises heating an organosilicon compound represented by said formula to a temperature from 25° C. to 175° C. in the presence of a lithium diorganosilanolate represented by the formula:

$$\text{LiO}\left(\begin{array}{c}\text{Me}\\|\\\text{SiO}\\|\\\text{Me}\end{array}\right)_n\text{Li}$$

wherein $n$ has a value of at least eight in an amount sufficient to provide from 0.001 to 10 parts by weight of lithium per 100 parts by weight of the organosilicon compound to produce the gum.

6. A process for condensing $\text{HO}(\text{Me}_2\text{SiO})_n\text{H}$ wherein $n$ has a value of at least eight, which comprises heating $\text{HO}(\text{Me}_2\text{SiO})_n\text{H}$ at a temperature from 90° C. to 150° C. and at reduced pressure in the presence of sufficient lithium hydroxide to provide from 1.0 to 2.0 parts of lithium per 100 parts by weight of the $\text{HO}(\text{Me}_2\text{SiO})_n\text{H}$ to produce a dimethylpolysiloxane gum.

7. A process for condensing $\text{HO}(\text{Me}_2\text{SiO})_n\text{H}$ wherein $n$ has a value of at least eight, which comprises heating $\text{HO}(\text{Me}_2\text{SiO})_n\text{H}$ at a temperature from 90° C. to 150° C. and at reduced pressure in the presence of $$\text{LiO}(\text{Me}_2\text{SiO})_n\text{Li}$$

to provide from 1.0 to 2.0 parts of lithium per 100 parts by weight of the $\text{HO}(\text{Me}_2\text{SiO})_n\text{H}$ to produce a dimethylpolysiloxane gum.

8. A process which comprises cocondensing (1) an organosilicon compound represented by the formula:

$$\text{HO}\left(\begin{array}{c}\text{R}\\|\\\text{SiH}\\|\\\text{R}\end{array}\right)_n\text{R}'$$

wherein R is a member selected from the group consisting of the unsubstituted monovalent hydrocarbon groups and the substituted monovalent hydrocarbon groups wherein each substituent is a member selected from the group consisting of the halogen atoms and the amino, hydroxyl, cyano, carbalkoxy, aminoalkylamino, alkoxy and aryloxy groups, R' is a member selected from the group consisting of the alkyl groups and the hydrogen atom and $n$ has a value of at least eight and (2) an alkoxysilane represented by the formula:

$$\text{R}_r\text{Si}(\text{OR}')_{4-r}$$

wherein R and R' have the above defined meanings and $r$ has a value from 1 to 3, said cocondensation being effected in the presence of a catalytic amount of a member selected from the group consisting of lithium hydroxide and lithium diorganosilanolates.

9. The process of claim 8 wherein the alkoxysilane is methyltriethoxysilane.

10. The process of claim 8 wherein the alkoxysilane is methylvinyldiethoxysilane.

References Cited in the file of this patent
UNITED STATES PATENTS

| | | |
|---|---|---|
| 2,438,478 | Hyde | Mar. 23, 1948 |
| 2,834,748 | Bailey et al. | May 13, 1958 |
| 3,017,385 | Sprung et al. | Jan. 16, 1962 |

FOREIGN PATENTS

| | | |
|---|---|---|
| 799,917 | Great Britain | Aug. 13, 1958 |
| 570,530 | Canada | Feb. 10, 1959 |

OTHER REFERENCES

Kantor: J. Amer. Chem. Soc., 76 (1954), 5190.
Grubb: J. Amer. Chem. Soc., 77 (1955), 1405.
Hurd: J. Amer. Chem. Soc., 76 (1954), 249.